United States Patent
Addy

(10) Patent No.: US 9,882,735 B2
(45) Date of Patent: Jan. 30, 2018

(54) REGIONAL CONTROL SYSTEM WITH MANUAL OVERRIDE

(71) Applicant: Honeywell International Inc., Morristown, NJ (US)

(72) Inventor: Kenneth L. Addy, Massapequa, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 429 days.

(21) Appl. No.: 14/177,377

(22) Filed: Feb. 11, 2014

(65) Prior Publication Data

US 2015/0229489 A1    Aug. 13, 2015

(51) Int. Cl.
| | | |
|---|---|---|
| G01M 1/38 | (2006.01) | |
| H04L 12/28 | (2006.01) | |
| G05B 15/02 | (2006.01) | |
| G05D 23/19 | (2006.01) | |

(52) U.S. Cl.
CPC .......... *H04L 12/2816* (2013.01); *G05B 15/02* (2013.01); *G05D 23/1917* (2013.01); *H04L 12/2818* (2013.01); *H04L 12/2825* (2013.01); *H04L 12/2829* (2013.01); *H04L 2012/2841* (2013.01)

(58) Field of Classification Search
None
See application file for complete search history.

(56) References Cited

U.S. PATENT DOCUMENTS

| | | | | |
|---|---|---|---|---|
| 7,091,865 | B2 * | 8/2006 | Cuddihy | G08B 21/0492 340/539.11 |
| 7,103,511 | B2 * | 9/2006 | Petite | G05B 23/0208 340/870.06 |
| 8,155,767 | B2 * | 4/2012 | ElMankabady | G05B 15/02 700/83 |
| 8,502,679 | B2 * | 8/2013 | Ayon | A61B 5/113 340/384.7 |
| 2006/0075065 | A1 * | 4/2006 | Renkis | G08B 13/19619 709/217 |
| 2006/0155851 | A1 | 7/2006 | Ma et al. | |
| 2008/0046387 | A1 * | 2/2008 | Gopal | G01D 4/004 705/412 |
| 2009/0057428 | A1 * | 3/2009 | Geadelmann | G05B 15/02 236/51 |
| 2011/0071656 | A1 * | 3/2011 | McKiel, Jr. | G06N 5/02 700/90 |
| 2013/0103622 | A1 | 4/2013 | Matsuoka et al. | |

(Continued)

OTHER PUBLICATIONS

Extended European search report for corresponding EP patent application 15152950.0, dated Jun. 2, 2015.

*Primary Examiner* — Evral E Bodden
(74) *Attorney, Agent, or Firm* — Husch Blackwell LLP

(57) ABSTRACT

A regional monitoring system can establish and store patterns of signals from sensors or patterns of signals coupled to actuators. Incoming patterns can be compared to pre-stored patterns, and in the presence of a disparity therebetween, a message can be sent wirelessly to a displaced individual associated with the region indicative of the disparity. The individual can override a pre-established action associated with one of the pre-stored patterns. Monitoring systems can include security monitoring systems, fire safety monitoring systems or HVAC-type systems.

15 Claims, 1 Drawing Sheet

(56) References Cited

U.S. PATENT DOCUMENTS

2013/0214923 A1\* 8/2013 Sheridan ............ G08B 21/0423
 340/521
2014/0059466 A1\* 2/2014 Mairs .................... G06F 3/0482
 715/771

\* cited by examiner

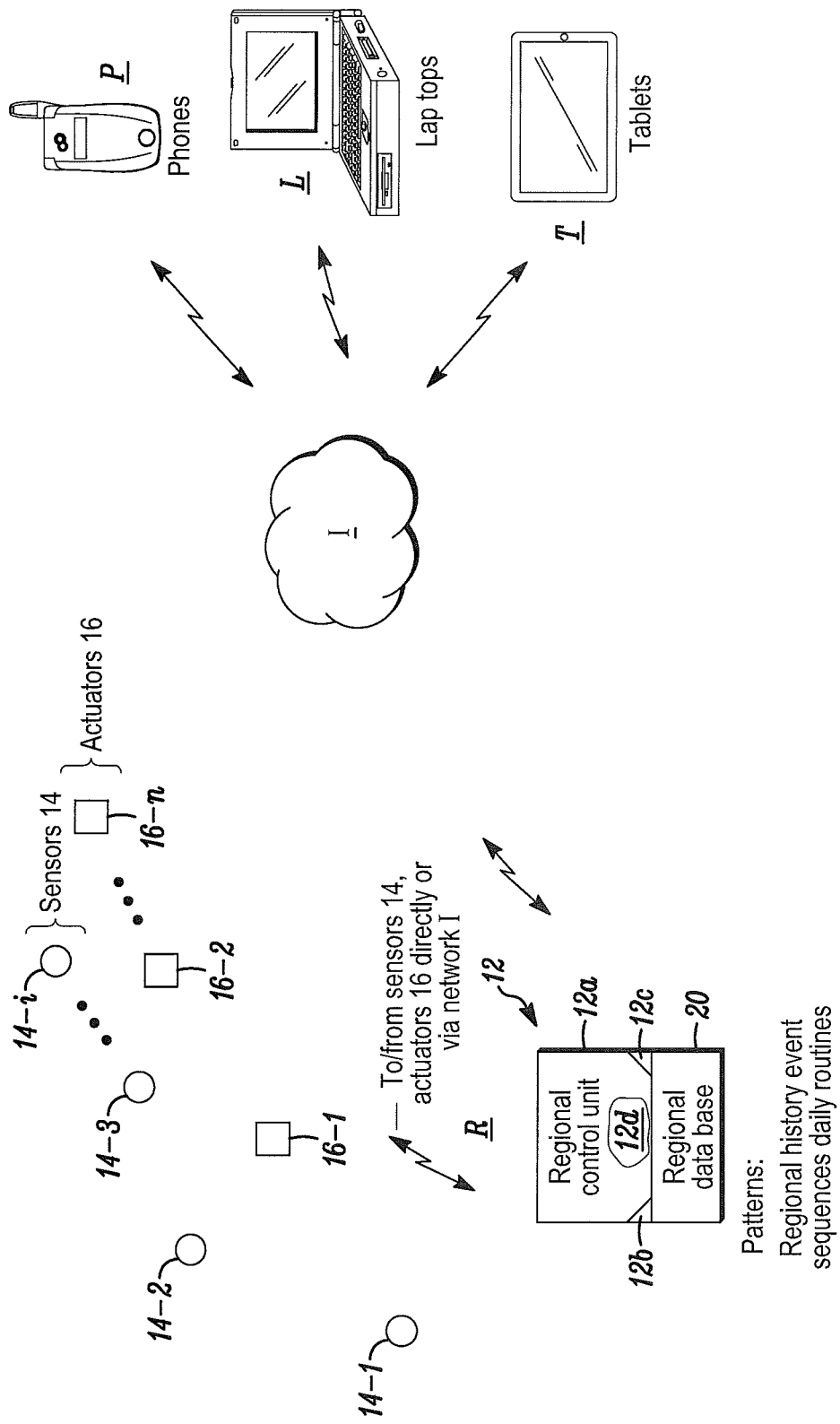

REGIONAL CONTROL SYSTEM WITH MANUAL OVERRIDE

FIELD

The application pertains to regional monitoring and control systems. More particularly, the application pertains to such systems that notify a user of a detected abnormality so that the user can seek additional information or override a preselected response by the systems.

BACKGROUND

As connected home management/control systems become more common and as eco-systems of connected devices emerge, e.g. ZigBee and z-Wave, there is an opportunity to further build upon the control of certain equipment settings remotely. In fact, it is now common place to, if a homeowner thinks that he/she may have forgotten to lock a front door, check a door lock status using a remote phone via, for example, Honeywell's TOTALCONNECT brand system and TUXEDO brand home control system and remotely lock the front door using a z-Wave enabled door lock.

Products or systems with learning capabilities do exist and are publicly available. However, known systems do not provide for remote manual exception handling, which is important for locks and security.

BRIEF DESCRIPTION OF THE DRAWINGS

FIG. 1 illustrates a system in accordance herewith.

DETAILED DESCRIPTION

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

In one aspect hereof, a regional control system installed, for example, in a residence can learn and understood the regular patterns of a daily routine associated with the residence to detect variations from the learned pattern. A message can be sent to a home owner's phone to inform the home owner as follows: "I see that there is no activity in the home for the past 10 minutes—do you want to lock the front door as usual?" Such communications enable the home owner to manually override a pre-established operational sequence.

In yet another aspect hereof, a home control system 1) knows time and day, 2) knows internal activity and entrance/exit activity, 3) knows status of lights, locks, garage doors, shades, temperature, etc., and 4) has a "big data" record of the routine activities in a home or building. A TOTALCONNECT brand home security system can send events and video clips to pre-arranged email addresses and (text) phone numbers.

The home control system that determines an exception to a daily routine that the system itself has learned can send a message to one of the pre-arranged email addresses providing a URL for a remote person to manually take or override a preset action. Communicating with the remote person, for example, the home owner, to provide a manual override overcomes the problem when something non-routine occurs, for example, a school closing due to snow.

In a further aspect, an administrative event log for home control activities can be maintained for accounts with time/day combined with any activity in the home. An automated system can review entire system status with historical data for sensors and controllers for approximately similar times of a day/week. If a database of event sequences is different from recent action, then email can be sent to the home owner with a link to a log-in screen/automation screen as a reminder.

Those of skill will understand that a variety of control/monitoring systems come within the spirit and scope hereof. For example, regional security systems, life safety monitoring systems, or HVAC systems can all use the learning processes and manual override capabilities described herein. Further, the type of region being monitored or controlled is not a limitation hereof. Control/monitoring systems as described herein can be used in residential, commercial, or industrial settings, all without limitation.

FIG. 1 illustrates a system 10 in accordance with the above. The system 10 can include a control unit 12 that can be wired or wirelessly coupled to a plurality of sensors, such as 14-1, 14-2 . . . 14-*i*, as well as a plurality of actuators, such as 16-1, 16-2 . . . 16-*i*. The actuators 16-*i* can be under the control of the unit 12. Alternately, they can be manually activated as with a manual switch and feedback a status signal to unit 12.

As those of skill will understand, the sensors 14 and the actuators 16 can be installed in a region R being monitored. Without limitation, one type of region is a home or a residence.

The control unit 12 can be located, at least in part, in the region R. For example, the unit 12 can be associated with a manually operable control panel, indicated at 12*a*, that the home owner can use to control the unit 12 and associated sensors 14 or actuators 16. The unit 12 can be located adjacent to the panel 12*a* or can be displaced therefrom outside of the region R and communicate wirelessly with the panel 12*a*.

The control unit 12 can also be in communication with a regional data base 20 that might be located in the vicinity of the unit 12 or at a displaced location. The data base 20 can include various patterns indicative of behavior of individuals that live at the residence. These can include, without limitation, historical temperature, lighting patterns, door locking patterns, or other activities associated with the region R, such as pre-stored event sequences or pre-stored information as to daily routines of those that live at the residence.

The unit 12 can be implemented, at least in part, with a programmed processor, such as 12*b*, and associated control software 12*c*. In one aspect, the unit 12 can sense and store the patterns associated with life activities of residents at the home, including comings and goings, preferred temperatures, lighting schedules throughout the home, and the like, without limitation, as noted above.

The unit 12 can also implement comparison pattern recognition processes via circuitry and executable instructions 12*d*, wherein newly detected patterns can be compared to pre-stored patterns. The details of such processing are not limitations hereof, except as discussed below. Such processing can also be carried out at a location displaced from one or both of the unit 12 or the data base 20.

Advantageously, results of such comparison processing can be forwarded via one or more computer networks, for example, the Internet I, to displaced residents or users of the region. Those individuals can receive alerts or messages remotely via smart phones P, lap top computers L, tablet computers T, or any other Internet or wirelessly enabled communication device, without limitation.

Where current event sequence(s) are different from similar stored event sequences, the messages can be sent via the network I to one or more of the units P, L, or T, without limitation, alerting the individuals as to the detected variance. On receipt, the individuals can manually override any pre-stored response, which might be based on numerous earlier situations, but which does not apply in the present instance. Hence, in embodiments hereof, the available manual override capability overcomes the problem of something non-routine occurring, which needs special attention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be add to or removed from the described embodiments.

The invention claimed is:

1. A system comprising:
   a regional control system coupled via a wireless or wired medium to a plurality of sensors, a plurality of actuators, a light, a lock, a garage door, a shade, and a thermostat; and
   a data base coupled to the regional control system,
   wherein the data base stores stored discernable events, regional history event sequences, or behavior patterns,
   wherein the stored discernable events, regional history event sequences, or behavior patterns are accessible to the regional control system,
   wherein the regional control system is configured to detect a variation between the stored discernable events, regional history event sequences, or behavior patterns stored in the data base and a corresponding current discernable event, regional history event sequence, or behavior pattern detected by one of the plurality of sensors by comparing the stored discernable events, regional history event sequences, or behavior patterns to the corresponding current discernable event, regional history event sequence, or behavior pattern,
   wherein the corresponding current discernable event, regional history event sequence, or behavior pattern comprises the plurality of sensors determining that no human activity has been detected within a region being monitored by the regional control system for a predetermined time period,
   wherein the corresponding current discernable event, regional history event sequence, or behavior pattern comprises the one of the plurality of sensors detecting any activity at an entrance or an exit of the region being monitored by the regional control system,
   wherein the regional control system, in response to detecting the variation, transmits an advisory message to a displaced location,
   wherein the regional control system receives an activity altering communication in response to the advisory message, and
   wherein the regional control system alters a status of the light, the lock, the garage door, the shade, and the thermostat in response to the activity altering communication.

2. The system as in claim 1 wherein the regional control system, responsive to signals from the plurality of sensors, implements a pattern defining process and stores a resultant pattern in the data base.

3. The system as in claim 2 wherein the signals from the plurality of sensors are evaluated by the pattern defining process to produce a current pattern, and wherein the current pattern is compared to the resultant pattern.

4. The system as in claim 3 wherein, responsive to results of comparing the current pattern to the resultant pattern, a notification message is transmitted to the displaced location for presentation to a displaced user.

5. The system as in claim 3 wherein the regional control system comprises a security monitoring system, a fire safety system, or a HVAC-type system.

6. The system as in claim 1 wherein the regional control system, responsive to signals from the plurality of actuators, implements a pattern defining process and stores a resultant actuator related pattern in the data base.

7. The system as in claim 1 further comprising pattern establishing circuitry, responsive to signals from the plurality of sensors or the plurality of actuators, and pattern recognition circuitry.

8. The system as in claim 7 wherein the pattern establishing circuitry and the pattern recognition circuitry communicate wirelessly via a network with the regional control system.

9. A method comprising:
   providing a data base that includes a plurality of pre-stored discernable events, regional history event sequences, or behavior patterns associated with a region being monitored;
   responding to received signals that correspond to a current discernable events, regional history event sequences, or behavior pattern of an event by creating a corresponding discernable events, regional history event sequences, or behavior pattern indicative of the current discernable events, regional history event sequences, or behavior pattern of the event, wherein the current discernable events, regional history event sequences, or behavior pattern of the event comprises determining that no human activity has been detected within the region being monitored for a predetermined time period and detecting any activity at an entrance or an exit of the region being monitored;
   comparing the corresponding discernable events, regional history event sequences, or behavior pattern to the plurality of pre-stored discernable events, regional history event sequences, or behavior patterns;
   when a variance is detected, communicating with a displaced communications unit by forwarding, to the displaced communications unit, an alert indicating an existence of the variance;
   providing an opportunity to receive, from the displaced communications unit, an instruction; and
   altering a status of a light, a lock, a garage door, a shade, and a thermostat within the region being monitored in response to receiving the instruction.

10. The method as in claim 9 wherein forwarding the alert comprises forwarding a URL to the displaced communications unit.

11. The method as in claim 10 wherein providing the opportunity to receive the instruction from the displaced communications unit comprises enabling a user of the displaced communications unit to accept an exceptional condition by entering one of a single click or a single key instruction into the displaced communications unit.

12. The method as in claim 9 wherein the corresponding discernable events, regional history event sequences, or behavior pattern comprises an exceptional condition, and wherein forwarding the alert comprises forwarding a URL to the displaced communications unit and enabling a user of the displaced communications unit to accept the exceptional condition by entering one of a single click or a single key instruction into the displaced communications unit.

13. The method as in claim 12 wherein the displaced communications unit is selected from a class including a wireless telephone, a tablet computer, or a laptop computer.

14. A system comprising:
   a light;
   a lock;
   a garage door;
   a shade;
   a thermostat;
   a data base including a plurality of pre-stored discernable events, regional history event sequences, or behavior patterns associated with a region being monitored;
   a control unit that receives signals from a plurality of sensors monitoring the region being monitored that correspond to a current discernable events, regional history event sequences, or behavior pattern of an event in the region being monitored and that creates a corresponding discernable events, regional history event sequences, or behavior pattern indicative of the current discernable events, regional history event sequences, or behavior pattern of the event, wherein the current discernable events, regional history event sequences, or behavior pattern of the event comprises determining that no human activity has been detected within the region being monitored for a predetermined time period and detecting any activity at an entrance or an exit of the region monitored; and
   a processor that compares the corresponding discernable events, regional history event sequences, or behavior pattern to the plurality of pre-stored discernable events, regional history event sequences, or behavior patterns, detects a variance between the corresponding discernable events, regional history event sequences, or behavior pattern and the plurality of pre-stored discernable events, regional history event sequences, or behavior patterns, communicates with a displaced communications unit, forwards an alert identifying the variance to the displaced communications unit when the variance is detected, provides an opportunity to receive, from the displaced communications unit, an instruction accepting or rejecting a pre-established output based on the plurality of pre-stored discernable events, regional history event sequences, or behavior patterns, and alters a status of the light, the lock, the garage door, the shade, and the thermostat within the region being monitored in response to the instruction.

15. The system as in claim 14 wherein the alert comprises a URL, wherein the displaced communications unit is selected from a class including a wireless telephone, a tablet computer, or a laptop computer, and wherein the event comprises an exceptional condition that is accepted by entering one of a single click or a single key instruction into the displaced communications unit.

* * * * *